United States Patent

[11] 3,567,847

[72] Inventor Edgar E. Price
648 Applegrove Circle, Webster, N.Y. 14580

[21] Appl. No. 789,317
[22] Filed Jan. 6, 1969
[45] Patented Mar. 2, 1971

[54] ELECTRO-OPTICAL DISPLAY SYSTEM
12 Claims, 6 Drawing Figs.

[52] U.S. Cl. ........................................................ 178/5.4, 178/7.3, 350/161
[51] Int. Cl. ........................................................ H04n 9/14, H04n 5/74
[50] Field of Search ........................................... 178/5.4, 5.4 (BDP), 7.3 (D), 7.5 (D), 7.85, 7.87; 350/160, 161, 163; 250/199

[56] References Cited

UNITED STATES PATENTS

| | | | |
|---|---|---|---|
| 2,509,545 | 5/1950 | Walton | 178/7.3 |
| 2.983,824 | 5/1961 | Weeks et al. | 250/217 |
| 3,302,027 | 1/1967 | Fried et al. | 250/199 |
| 3,385,927 | 5/1968 | Hamann | 178/7.5 |

*Primary Examiner*—Robert L. Richardson

ABSTRACT: An electro-optical display system particularly for projecting an enlarged color television image on a screen in which the transmitted signals are converted into points of light modulated by a Fabry-Perot multiple interferometric light modulator assembly.

Edgar E. Price
INVENTOR.

Edgar E. Price
INVENTOR.

ELECTRO-OPTICAL DISPLAY SYSTEM

BACKGROUND OF THE INVENTION

The systems presently available for display of large color television images are too expensive for application to devices intended for use in the home. The systems now available for display of home color television images are limited in size, clarity and color quality of the displayed image.

SUMMARY OF THE INVENTION

An object of the present invention is to provide an improved system for display of color television images in the home.

An additional object of this invention is to provide in a display system means for simultaneous and independent modulation or on-off switching of a multiplicity of points or small areas of light.

This invention describes means to modulate a multiplicity of transmitted or reflected light beams by varying the positions of polished and coated optical surfaces in interferometric systems. Control over the position of each optical surface is maintained by locating the surface directly on electrostrictive material or by locating the surface on an optically workable material which is firmly attached to the electrostrictive material.

Interferometric modulation of light is well known in the present art and is described in terms of single beam modulation in U.S. Pat. No. 3,202,052 and in terms of multiple beam simultaneous modulation to provide an image formed interferometrically over an extended area in U.S. Pat. No. 3,100,817 and U.S. Pat. No. 3,233,040. There are certain practical difficulties in applying the teachings of the latter two U.S. patents which do not exist in devices utilizing the teachings of the invention described herein.

U.S. Pat. No. 3,100,817 and U.S. Pat. No. 3,233,040 each describe the use of thin sheets of electrostrictive material with the direction of electrical polarization perpendicular to the faces. Members of the barium titanate or lead zirconate family of piezoelectric ceramics are well suited for use in an interferometrically modulated system. The materials are hard enough to be optically worked to a flat surface and stable enough to hold their shapes after working. The electrical characteristics are also suitable for this application. For example in the case of one material a potential difference of about 625 volts provides a surface displacement of one-quarter wavelength, the maximum required for full modulation. When sheets of piezoelectric ceramic are used to create a full frame interferometrically modulated image, it is desirable that they be as thin as feasible to provide maximum resolution. However, it is desirable that thickness be sufficient to prevent depolarization of the material with signal voltage. The polarizing voltage is 60 volts per mil of thickness. It is desirable that the signal voltage be below this value. Thus it is desirable that material thickness be greater than 11 mils and preferably greater than 30 mils.

These two requirements are in opposition to each other. U.S. Pat. No. 3,233,040 describes a thin sheet of electrostrictive material affixed to a glass-wire substrate having wires passing through the glass to permit electrical charges to be transmitted through the glass wall of a cathode ray tube. One commercially available glass-wire substrate has wires of 0.001 inch diameter spaced 0.004 inch center to center. Thus to take advantage of the resolution possible with this wire spacing it would be desirable to place a layer of electrostrictive material of about 0.002 inch thickness cemented to the glass-wire substrate. As noted before this is too thin a layer properly to accept an electrical signal of 625 volts. If a thicker layer of electrostrictive material is attached to the glass-wire matrix the resolution possible is determined by material thickness rather than by wire spacing.

In the following detailed description of this invention it will be shown that it is possible to retain high resolution while using thick electrostrictive material by separating immediately adjacent volumes of electrostrictive material with judiciously placed thin air spaces. Description will be given of embodiments of this concept in producible practicable devices capable of providing line-to-frame scanned television images in color.

Other objects and many of the attendant advantages of this invention will be readily appreciated as the same becomes better understood by reference to the following detailed description when considered with the accompanying diagrammatic representational drawings wherein:

FIGURE DESCRIPTION

DETAILED DESCRIPTION

Figures 1, 2, 3, 4, 5:
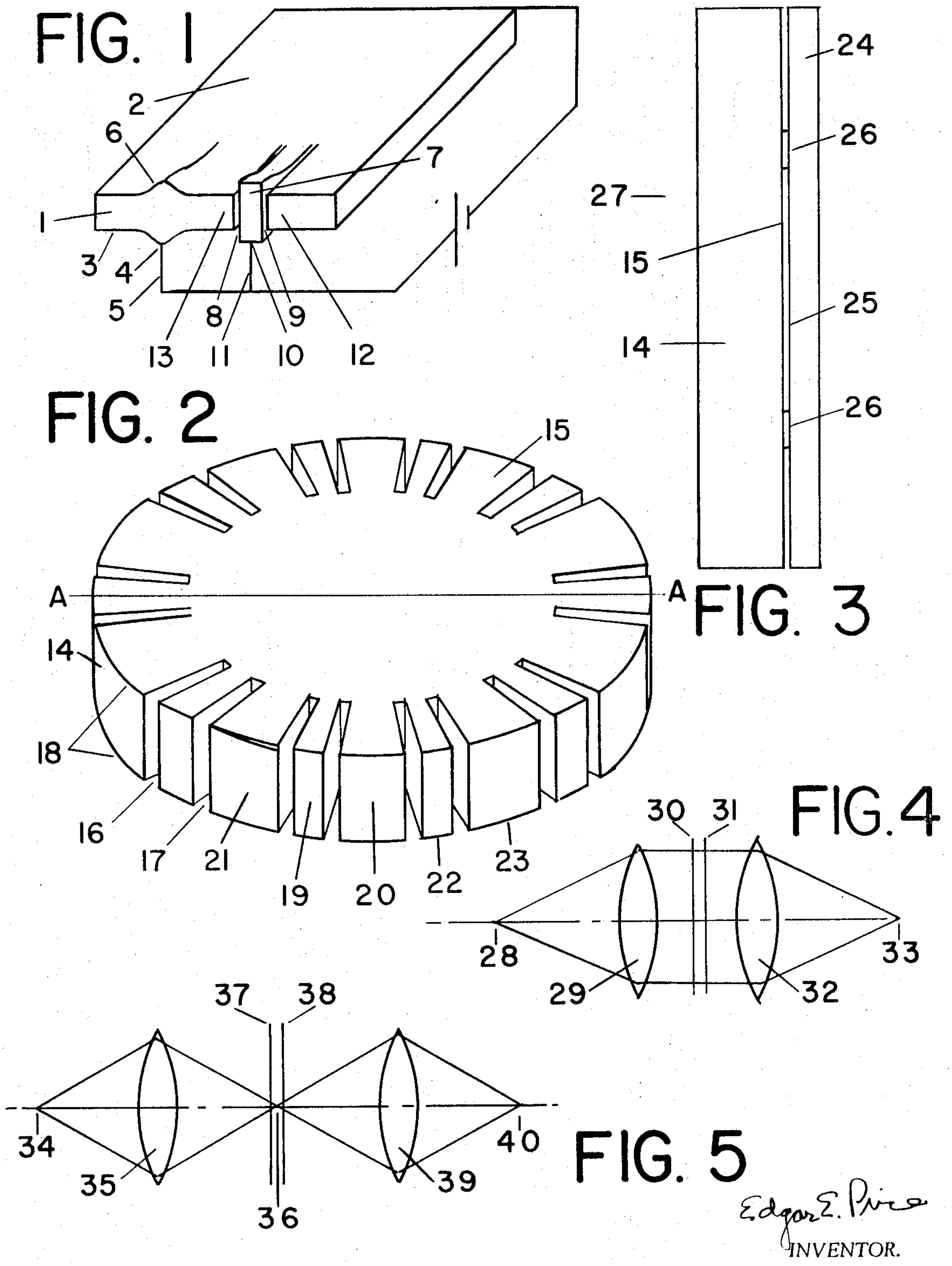
FIG. 1 shows a thick slab of piezoelectric material polarized through its thickness and a means for reducing the size of an area of surface which is displaced in response to an electrical potential applied to a point on the opposite surface.
FIG. 2 shows a disc of piezoelectric material configured to provide a multiplicity of independently controlled moveable elements.
FIG. 3 shows an assembly of the piezoelectric disc of FIG. 2 assembled to provide a multiplicity of independently controlled Fabry-Perot etalons.
FIG. 4 illustrates a Fabry-Perot etalon used to modulate a beam of collimated light.
FIG. 5 illustrates a Fabry-Perot etalon used to modulate a conical beam of light at its focus.

FIG. 1 represents a rectangle of piezoelectric material 1 of sufficient thickness to maintain dimensional stability. Upper surface 2 is a metallized surface of uniform potential. Lower surface 3 is an uncoated insulating surface. The material is polarized through its thickness. An electrical potential applied at a point such as 4 by wire 5 will create lines of electrical force in an approximately conically-shaped pattern radiating from point 4 to an area 6 on surface 2 larger than the point 4 but small compared to the whole surface area 2. This region of electrical potential difference will cause the usual piezoelectric effect to occur. Thus small area 6 on surface 2 will be deformed slightly. The surface deformity can be made visible in an interferometric system.

A small volume of piezoelectric material 7 is attached to the main body of material 1 but is partially isolated from the main body 1 by air slots 8 and 9. The air slots serve two purposes. If an electrical potential is applied to point 10 by wire 11 the electrical lines of force will be contained within small volume 7 and will not penetrate through the airspaces 8 and 9 to the adjoining regions of piezoelectric material at 12 or 13. Thus only that part of piezoelectric material 7 between air slots 8 and 9 will be changed in dimension by application of electrical potential to point 10.

Additionally the air slots 8 and 9 provide mechanical separation of small region 7 of piezoelectric material 1 from the immediately adjacent regions 12 and 13 so that the rigidity of the piezoelectric material does not come into effect and cause small region 7 to drag mechanically regions 12 and 13 when small region 7 is electrically activated. By suitable selection of distance between air slots 8 and 9 it is possible to create more regions such as 7 per unit length of piezoelectric material 1 than regions such as 6.

FIG. 2 illustrates a piezoelectric ceramic disc having a multiplicity of partially isolated separately controllable small volumes of piezoelectric material. 14 is a disc of piezoelectric material preferably a piezoelectric ceramic. Surface 15 is optically flat, polished, and coated with a conducting layer so that it is of uniform electrical potential. As shown 10 sets of air slots such as 16 and 17 are shown milled radially in from the outer cylindrical surface 18 of piezoelectric disc 14 to form 10 separate small volumes of piezoelectric material such as 19 which are connected to the main body of material 14 but are isolated electrically and mechanically from the adjoining regions of material such as 20 and 21. As illustrated there are thus 10 narrow and 10 wider regions of piezoelectric ceramic which can be dimensionally controlled independently of each other by application of a suitable electrical potential at points such as 22 or 23. Although only 20 such separate volumes are shown, it is very feasible to provide 600 such separate volumes in a disc of 3 inches diameter. In this case the slots would be 0.005 inch or less in circumferential thickness and the solid regions of piezoelectric material would be 0.010 inch or more in circumferential thickness. The thickness of the disc can be as large as necessary to maintain dimensional stability and to accept the necessary electrical potential.

FIG. 3 is a section through AA of FIG. 2 with a transparent cover plate added to create an assembly of a multiplicity of separate electrically modulated Fabry-Perot interferometers. Here 14 represents the disc of piezoelectric ceramic previously shown in FIG. 2. 24 is a transparent optical flat having a partially transparent coating on surface 25. A preselected spacing of three wavelengths or less between surfaces 15 and 25 is provided by spacer ring 26 which is vacuum coated to optical flat 24. The complete assembly of FIG. 3 is identified by numeral 27.

FIG. 4 and FIG. 5 illustrate two methods of using a Fabry-Perot etalon to modulate a light beam. In FIG. 4 the light is collimated when passing through the Fabry-Perot etalon. In FIG. 5 the light beam is focused on the etalon. In FIG. 4 light from point source 28 is collimated by lens 29 and passes through plane partially transmitting and partially reflecting surfaces 30 and 31 in collimated mode. The collimated beam is focused by lens 32 to point 33.

In FIG. 5 light from point source 34 is focused to a point 36 by lens 35 at Fabry-Perot etalon with plane partially transmitting partially reflecting surfaces 37 and 38. The point of light at 36 is refocused by lens 39 to point 40. It can be seen that a much smaller area of the Fabry-Perot etalon is used to modulate the light in FIG. 5 than is necessary in FIG. 4. By using the optical system of FIG. 5 a more closely spaced array of modulators can be utilized than is possible if the optical system of FIG. 4 is used.

In use it is necessary to provide electrical potentials to points such as 22 or 23. This may be done either by enclosing the assembly 27 of FIG. 3 within a cathode-ray tube and directing an electron beam in circular scan successively to points such as 22 and 23; or, alternatively, it is feasible to connect wires from all points such as 22 and 23 to an electronic circuit assembly containing an electrical switching system so that signals can successively be transmitted to all points such as 22 and 23. The use of both such devices is well known in the state of the art today and neither device is described in detail herein.

Figure 6:
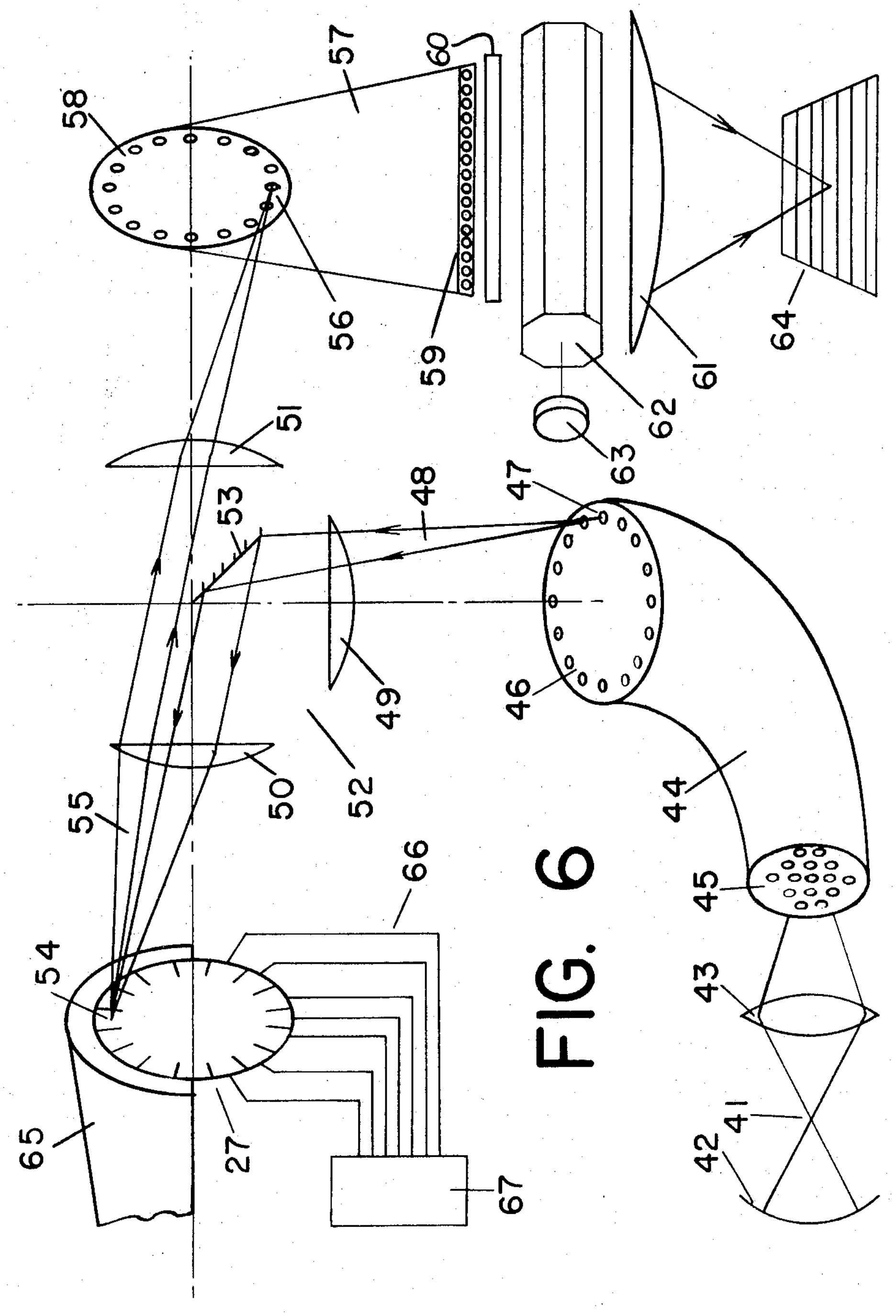
FIG. 6 shows the device of FIGS. 2 and 3 as utilized in a complete optical system to provide for display of a color television picture.

Assuming the feasibility of providing electrical signals to all points such as 22 and 23 in FIG. 2 so that each separate modulator element can be driven as a separate Fabry-Perot interferometric modulator, it is only necessary to provide an auxiliary optical system to direct light to each modulator and then redirect the modulated light to form a desired pattern of modulated light spots or small areas. FIG. 6 illustrates a complete optical system including the array of Fabry-Perot interferometric light modulators 27 of FIG. 3.

In FIG. 6, 41 is a concentrated light source. For some applications it may be a small tungsten filament, for other applications it may be a concentrated arc lamp. Condensing mirror 42 and condensing lens 43 together comprise a condensing system which forms an image of light source 41 on the entrance end 45 of fiber bundle to circle converter 44. At entrance end 45 a multiplicity of optical fibers is closely spaced. Each fiber receives a part of the highly concentrated light flux in the image of light source 41 formed by lens 43. Each optical fiber transmits the light received along its length to the other end 46 of fiber bundle to circle converter 44. 46 is a circular array of optical fiber ends, each of which is a point source of light such as 47 from which a beam of light 48 emanates until it is intercepted by lens element 49 of lens system 52, comprising lens elements 49, 50, and 51 and mirror 53. Lens system 52 as shown has been selected to illustrate clearly the optical function which it performs. In an actual device a more efficient lens system would be used to perform the same optical function. Lens element 49 essentially collimates the light in cone 48. That portion of collimated light beam 48 which is reflected by mirror 53 is reflected towards lens element 50 which refocuses the collimated light beam to a point 54 located on one of the individual Fabry-Perot interferometric modulators of the assembly 27 of FIG. 3 where modulation occurs. The modulated beam of light is reflected as light beam 55 which is reimaged to a point of light 56 by lens elements 50 and 51.

Point of light 56 coincides with the end of one fiber in circle to line converter 57 in which a multiplicity of optical fibers are arranged to have one end of each fiber located in a circle 58 and the other end of each fiber located in a line at 59. The same fibers are adjacent to each other in both circle and line except for the fibers at each end of the line which are separated by the length of the line although their ends in the circle are immediately adjacent. Each fiber in circle 58 corresponds to a fiber in the circular end of fiber bundle to circle converter 44. Thus each point of light emanating from a fiber in bundle to circle converter 44 is redirected into a fiber in circle 58 of optical fiber circle to line converter 57 after being modulated by one modulator of the array of Fabry-Perot interferometric modulators 27 of FIG. 3. Each separately modulated light beam which enters fiber optics circle to line converter 57 through one of the optical fiber ends in circle 58 is transmitted along the length of the fiber which it has entered and emerges from the end of the fiber which is in line 59 at the end of optical fiber circle to line converter 57. At 59 light from each fiber emanates as a cone of light and the end of each fiber is an intensity modulated point of light. At 59 there is thus a line of separate points of light individually modulated. By providing 600 fibers in bundle to circle converter 44 and circle to line converter 57 and by providing 600 modulators in the array of Fabry-Perot interferometric modulators 27 of FIG. 3 it is possible to provide a line of 600 separately modulated points of light at 59. The number 600 corresponds to the number of groups of three dots, red, green and blue, across a line in a shadow mask color television tube. By limiting the spectral content of light in this optical system to red, green or blue by duplicating the system twice from light source 41 to fiber optics line 59 to provide three complete sets of 600 separately modulated points of light in a line each in a separate color, red, green or blue, and by bringing the lines of light into optical coincidence by an array of dichroic filters 60 it is possible to create a line of 600 points of light each comprising three spectral components separately modulated. This line of color modulated points of light can be expanded into a frame of light by any of a number of slow speed electromechanically driven optical scanners. One such scanning system comprises lens 61 and octagonal prism 62 driven by synchronous motor 63. Such a scanner can be synchronized to the television frame rate such that the projected image 64 comprises 525 sets of 600 points of light corresponding to the 525 lines in a television frame. By controlling the intensity of each point of light according to the appropriate part of the signal in the transmitted color television signal, it is possible to project a color television picture to a screen. An octagonal prism such as that shown scans a line across a frame eight times per turn. Current television standards provide 60 fields per second or 3600 fields per minute. Thus 450 revolutions per minute are required of the prism. This is a very moderate scan rate, easily achieved. The interleaving of fields can be achieved by appropriate angular spacings on prism faces or by other means not described herein. Such interleaving is assumed to be provided by whatever electromechanically driven optical line-to-frame scanning system is utilized.

Electronic signals to actuate the individual modulators of the Fabry-Perot multiple modulator assembly 27 can be provided by locating the assembly in a cathode-ray tube 65 in which the electron beam traverses a circular path and successively actuates each separate Fabry-Perot modulator such as 54. Alternatively separate wires 66 can connect each modulator of assembly 27 to an electronic control circuit 67 which acts as an electronic buffer to process the video signal from a television receiver circuit into a form suitable to actuate each individual Fabry-Perot modulator.

It should be clear that other applications exist for an array of separately controlled points of light such as those described herein. It should also be noted that by decreasing the number of separately controlled optical modulators in a given size array the surface area of each can be increased so that each modulator can control intensity in a larger focused area of light than that which emanates from a single optical fiber end. In such cases each optical fiber shown in FIG. 6 can be replaced by an optical fiber bundle. It should also be noted that for some applications continuous control of light intensity is not required and that simple on-off switching is sufficient. With such modifications a variety of applications of the teachings of this invention are possible.

I claim:

1. A display system comprising a multiple interferometric light modulator assembly having a body of electrostrictive material optically polished to predetermined curvature and electrically conducting and optically coated on one surface and electrically insulating on an opposite parallel surface, a multiplicity of separate small discrete volumes of said electrostrictive material attached to and forming part of said body and each forming a Fabry-Perot interferometric light modulator, said volumes being partially separated from each other by narrow air slots extending from said polished conducting face of said electrostrictive material through the material to the opposite parallel insulating face, and a transparent optical element with two polished surfaces one adjacent to and accurately optically mated with said conductive surface on said electrostrictive material, coated with a semitransparent optical coating, and separated from said conductive surface on said electrostrictive material by a vacuum deposited spacer of thickness three wavelengths or less.

2. A display system according to claim 1, wherein the assembly is located within a cathode-ray tube with the insulating surface positioned to receive electrical charge deposited by a moving electron beam controlled in spatial position to charge successively each of said multiplicity of separate small discrete volumes of electrostrictive material.

3. A display system according to claim 1, wherein the assembly is connected electrically to an electronic control circuit by separate wires connected to the insulting faces of all said separate small discrete volumes of electrostrictive material.

4. A display system according to claim 1, wherein the body is a circular disc, and the spacer is centrally located and close to but not intersecting said narrow air slots.

5. A display system according to claim 4, wherein the assembly is located within a cathode-ray tube with the insulating surface positioned to receive electrical charge deposited by a moving electron beam controlled in spatial position to charge successively each of said multiplicity of separate small discrete volumes of electrostrictive material in circular disposition.

6. A display system according system according to claim 4, wherein the assembly is connected electrically to an electronic control circuit by separate wires connected to the insulating faces of all said separate small discrete volumes of electrostrictive material in circular disposition.

7. A display system according to claim 1 for use with a source of color television video signals to create an optical image by enlarged projection onto a viewing screen, including:

a light source of small size and high brightness;

a condensing system forming a small concentrated image of the light source;

a first fiber optics assembly having the fibers closely packed and parallel to each other at one end where light is received from the light source image and having the fibers separated from each other at the other end, forming a multiplicity of small points of light;

a first optical system receiving light from the multiplicity of small points of light formed by the first fiber optics assembly and forming a multiplicity of small light point images each on a separate Fabry-Perot interferometric light modulator within the multiple Fabry-Perot interferometric light modulator assembly;

a second optical system receiving light from the multiplicity of small points of light after modulation by the array of Fabry-Perot interferometric light modulators and forming a multiplicity of small light point images;

a second fiber optics assembly having the fibers separated from each other at one end to receive light from modulated light point images formed by said second optical system and having the fibers adjacent to each other at the other end of the assembly forming a multiplicity of modulated points of light in a straight line;

the above-described system duplicated twice to provide three duplicate light modulating systems forming three multiplicities of modulated points of light in identical straight lines and with red, green and blue filters respectively in the several systems;

a dichroic set of mirrors combining optically said three identical straight lines of modulated points of light into one straight line of points of light each including separately modulated red, green and blue components;

an electromechanical scanning and optical projection system to scan and enlarge optically said straight line of combined red, green and blue points of light across a viewing screen forming a large frame of 525 lines of colored points of light corresponding to the 525 lines in a television picture; and electrical and electronic means to receive and process a color television signal to provide appropriate control voltages to each separate Fabry-Perot interferometric light modulator of the assembly and to provide appropriate synchronous control voltages to said electromechanical optical scanning and projection system.

8. A display system according to claim 7, wherein the assembly is located within a cathode-ray tube with the insulating surface positioned to receive electrical charge deposited by a moving electron beam controlled in spatial position to charge successively each of said multiplicity of separate small discrete volumes of electrostrictive material.

9. A display system according to claim 7, wherein the assembly is connected electrically to an electronic control circuit by separate wires connected to the insulating faces of all said separate small discrete volumes of electrostrictive material.

10. A display system according to claim 7, wherein the body is a circular disc, and the spacer is centrally located and close to but not intersecting said narrow air slots.

11. A display system according to claim 10, wherein the assembly is located within a cathode-ray tube with the insulating surface positioned to receive electrical charge deposited by a moving electron beam controlled in spatial position to charge successively each of said multiplicity of separate small discrete volumes of electrostrictive material in circular disposition.

12. A display system according to claim 10, wherein the assembly is connected electrically to an electronic control circuit by separate wires connected to the insulating faces of all said separate small discrete volumes of electrostrictive material in circular disposition.